(No Model.) 2 Sheets—Sheet 1.

W. S. & H. BENTZ.
DEVICE FOR CHECKING HORSES.

No. 294,187. Patented Feb. 26, 1884.

Attest:
T. Walter Fowler
H. B. Applewhait

Inventors
W. Stuart Bentz
Harry Bentz
by their attys
A. H. Evans & Co.

(No Model.) 2 Sheets—Sheet 2.

W. S. & H. BENTZ.
DEVICE FOR CHECKING HORSES.

No. 294,187. Patented Feb. 26, 1884.

Attest:
J. Walter Fowler
H. B. Applewhaite

Inventors
W. Stuart Bentz
Harry Bentz
by their attys
A. N. Evans

UNITED STATES PATENT OFFICE.

W. STUART BENTZ AND HARRY BENTZ, OF YORK, PENNSYLVANIA.

DEVICE FOR CHECKING HORSES.

SPECIFICATION forming part of Letters Patent No. 294,187, dated February 26, 1884.

Application filed November 9, 1883. (No model.)

*To all whom it may concern:*

Be it known that we, W. STUART BENTZ and HARRY BENTZ, of York, State of Pennsylvania, have invented a new and useful Improvement in Devices for Checking Horses, of which the following is a full, clear, and exact description, reference being had to the accompanying drawings, making a part of this specification, in which—

Figure 1:
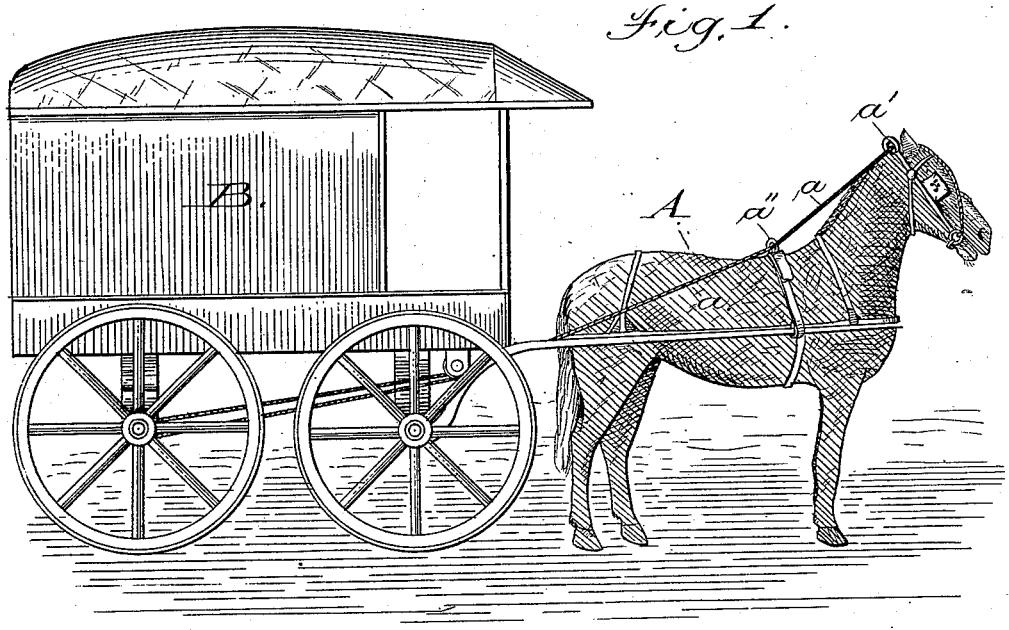
Figure 2:
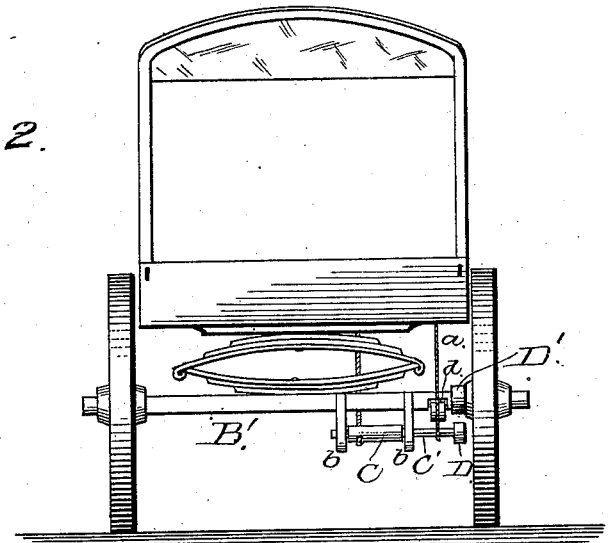
Figure 3:
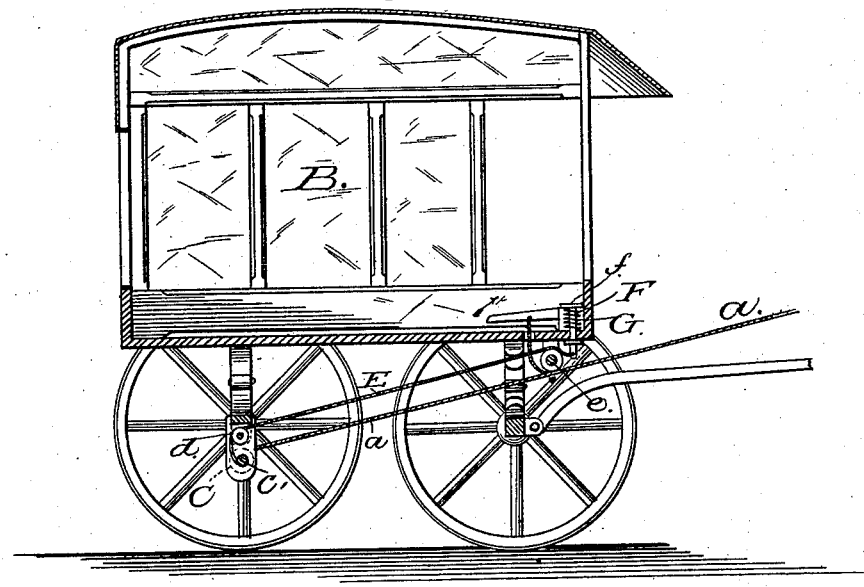
Figure 4:
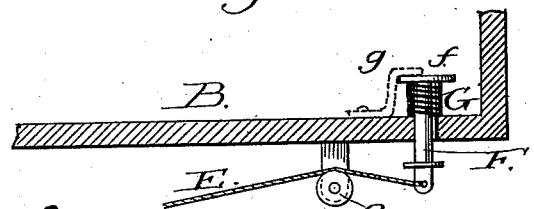
Figure 5:
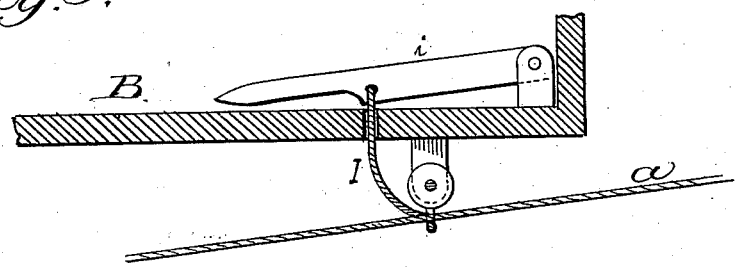

Figure 1 is a side elevation of a horse and wagon with our improvements attached. Fig. 2 is a rear view of the wagon. Fig. 3 is a longitudinal section of the wagon. Figs. 4 and 5 are details to be referred to.

Our invention has reference more particularly to the checking of spirited horses when in harness; and it consists of the combination of devices hereinafter explained and claimed.

To enable others skilled in the art to make and use our invention, we will proceed to describe the exact manner in which we have carried it out.

In the drawings, A represents a horse, and B a wagon, to which he is hitched. The check-line $a$, passing from each side of the bit through a ring, $a'$, on the horse's head, and a ring, $a''$, on the harness-saddle, continues along under the wagon-body, and is attached to a roller or drum, C, located beneath the rear axle, B', of the wagon, as shown in Fig. 3. The drum C is rigidly secured to the shaft C', which has its bearings in the stirrups $b\ b$, attached beneath the axle, as shown in Fig. 2. On the outer end of shaft C' is rigidly secured the rubber roller D, immediately beneath the inner end of the hub D'. The strap E, being attached to the shaft C', passes up over the anti-friction roller $d$, journaled in the lower part of the axle, as shown in Fig. 2. After passing over the roller $d$ the strap E passes forward under the wagon-body and over the anti-friction roller $e$, and is secured to the lower end of the spring-pin F, which passes down from inside of the body near the front, the said pin being located in a position easily and conveniently reached by the driver's foot. This pin is provided with a flat head, $f$, between which and the bottom of the wagon is secured a coiled spring, G, to hold the spring, or to raise it after it has been depressed by the driver's foot, unless it be locked down, as shown in Fig. 4, by the latch $q$. From this construction it is evident that when the pin F is depressed it will shorten up the strap E, which in turn will slightly hoist the outer end of the shaft C' and bring the rubber roller in contact with the hub D', which will cause the shaft C' to revolve whenever the wagon moves.

The operation, therefore, of this part of our invention is as follows: The driver, wishing to check a running horse, presses his foot on the pin F, which brings the rubber roller D in contact with the inner end of the hub, which immediately sets the roller D revolving, which in turn winds up the check-line $a$ on the drum C and checks the animal with a power not to be resisted. The power applied to the check-rein is regulated and controlled by the pressure of the driver's foot on the pin F. The power will be more or less as the pressure is heavy or light.

When it is desired to have the animal stand during the time the wagon is unoccupied, it is only necessary to press down the pin F and latch it, as shown in Fig. 4. Then should the horse move with the wagon, the check-rein is wound up on the drum C and movement of the horse is immediately checked.

In order to enable the driver to use the check-rein $a$ without resorting to the drum C, we pass a branch, I, of the check-rein $a$ up through the bottom of the wagon-body, and to this we attach a lever, $i$, in any desirable manner and of any desirable form, whereby the driver may, by hand or foot, operate the lever and check the animal.

Having thus described our invention, what we claim as new, and desire to secure by Letters Patent, is—

1. The axle B', provided with the anti-friction roller $d$, and the shaft C', provided with the drum C and rubber roller D, in combination with the hub D', check-rein $a$, and strap E, all constructed to operate substantially as and for the purpose set forth.

2. The axle B' and shaft C', provided with the drum C and roller D, in combination with the check-rein $a$ and strap E, and spring-pin F, all constructed to operate substantially as and for the purpose set forth.

W. STUART BENTZ.
HARRY BENTZ.

Witnesses:
T. KIRK WHITE,
WM. BEITZEL.